(12) United States Patent
Quechon et al.

(10) Patent No.: US 9,599,056 B2
(45) Date of Patent: Mar. 21, 2017

(54) SYSTEM AND METHOD FOR ESTIMATING THE RICHNESS OF THE GASEOUS MIXTURE IN THE COMBUSTION CHAMBER OF AN INTERNAL COMBUSTION ENGINE OF A MOTOR VEHICLE POWER PLANT

(71) Applicant: RENAULT s.a.s., Boulogne-Billancourt (FR)

(72) Inventors: Nicolas Quechon, Morsang sur Orge (FR); Philippe Obernesser, Paris (FR); Vincent Dugue, Igny (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 330 days.

(21) Appl. No.: 13/261,863

(22) PCT Filed: Nov. 6, 2012

(86) PCT No.: PCT/EP2012/071888
§ 371 (c)(1),
(2) Date: Jun. 25, 2014

(87) PCT Pub. No.: WO2013/072218
PCT Pub. Date: May 23, 2013

(65) Prior Publication Data
US 2014/0299104 A1   Oct. 9, 2014

(30) Foreign Application Priority Data
Nov. 14, 2011   (FR) ..................... 11 60327

(51) Int. Cl.
*F02D 41/30*   (2006.01)
*F02D 41/00*   (2006.01)
(Continued)

(52) U.S. Cl.
CPC ......... *F02D 41/30* (2013.01); *F02D 13/0261* (2013.01); *F02D 19/081* (2013.01);
(Continued)

(58) Field of Classification Search
CPC .... F02D 41/30; F02D 19/088; F02D 41/0062; F02D 41/1444; F02D 41/1458; F02D 41/182; F02D 41/0027; F02D 19/081
See application file for complete search history.

(56) References Cited

U.S. PATENT DOCUMENTS

2005/0211233 A1   9/2005   Moulin et al.

FOREIGN PATENT DOCUMENTS

DE   102 52 953   6/2004
EP   1 445 458   8/2004
(Continued)

OTHER PUBLICATIONS

French Search Report Issued Jul. 20, 2012 in Application No. FR 1160327 Filed Nov. 14, 2011.
(Continued)

*Primary Examiner* — Jacob Amick
(74) *Attorney, Agent, or Firm* — Oblon, McClelland, Maier & Neustadt, L.L.P.

(57) ABSTRACT

A system for estimating richness of a gaseous mixture in a combustion chamber of an internal combustion engine of a motor vehicle power plant, including a mechanism injecting an additional combustible gas into a fresh air intake circuit of the engine, a mechanism measuring concentrations of the additional gas in the fresh air intake circuit and in an engine exhaust gas circuit respectively, a mechanism determining a ratio between the measured concentration of the additional gas in the intake circuit and the measured concentration of the additional gas in the exhaust circuit, and a mechanism
(Continued)

estimating the richness of the gaseous mixture in the combustion chamber of the engine from the determined ratio.

8 Claims, 3 Drawing Sheets

(51) Int. Cl.
*F02D 41/14* (2006.01)
*F02D 41/18* (2006.01)
*F02D 13/02* (2006.01)
*F02D 19/08* (2006.01)
*F02B 25/14* (2006.01)
*F02D 19/06* (2006.01)
*F02B 75/02* (2006.01)

(52) U.S. Cl.
CPC ..... *F02D 41/0027* (2013.01); *F02D 41/0062* (2013.01); *F02D 41/1444* (2013.01); *F02D 41/1458* (2013.01); *F02D 41/182* (2013.01); *F02B 25/145* (2013.01); *F02B 2075/025* (2013.01); *F02D 19/0689* (2013.01); *F02D 19/0692* (2013.01); *F02D 41/0072* (2013.01); *F02D 41/1459* (2013.01); *F02D 2400/04* (2013.01); *F02M 26/05* (2016.02); *F02M 26/23* (2016.02); *Y02T 10/18* (2013.01); *Y02T 10/36* (2013.01); *Y02T 10/47* (2013.01)

(56) References Cited

FOREIGN PATENT DOCUMENTS

| EP | 1 571 318 | 9/2005 |
| FR | 2 868 127 | 9/2005 |

OTHER PUBLICATIONS

International Search Report Issued Mar. 13, 2013 in PCT/EP12/071888 Filed Nov. 6, 2012.

SYSTEM AND METHOD FOR ESTIMATING THE RICHNESS OF THE GASEOUS MIXTURE IN THE COMBUSTION CHAMBER OF AN INTERNAL COMBUSTION ENGINE OF A MOTOR VEHICLE POWER PLANT

The invention relates to estimating the richness of the gas mixture in the combustion chamber of an internal combustion engine of a motor vehicle power plant, in particular of an engine of two-stroke type.

All types of direct injection engines, whether two-stroke or four-stroke, have the same number of phases in a combustion cycle, in other words intake, exhaust, compression and expansion. However, the combustion cycles of a two-stroke engine are different from those of a four-stroke engine, because the crankshaft of a two-stroke engine executes one revolution instead of two. The time interval available for intake and exhaust is therefore reduced in a two-stroke engine. In addition, the intake and exhaust phases are clearly overlapped in a two-stroke engine, this overlapping also being known as crossover, and a scavenging phenomenon occurs.

The scavenging phenomenon corresponds to the fact that part of the gases admitted into the engine bypasses the combustion chambers of the cylinders and proceeds directly into the exhaust circuit of the gases without being burned. In other words, the entire amount of fresh air admitted into the engine is not enclosed in the combustion chambers. If the four-stroke engines have slight crossover between the intake and exhaust phases, the scavenging phenomenon also occurs in such engines. In particular, scavenging may be extensive for four-stroke engines that have periods of simultaneous opening of the intake and exhaust valves, for example in the case of strategies in which the exhaust valve is reopened during the intake phase.

The fact that neither the amount of air nor the amount of residual gases (denoted IGR) actually enclosed in the combustion chambers is known makes it difficult to control the engine precisely (for example, to determine the appropriate adjustments for responding to a demand of the driver). It is also difficult to optimize the efficiency, in particular the fuel consumption of the engine, and to control the level of polluting emissions, which depend strongly on the conditions of mixing of air and residual gases in the combustion chamber.

Furthermore, the polluting emissions are diluted with the amount of air originating from the scavenging phenomenon. This dilution then interferes with the traditional use of a richness sensor. In particular, a measurement of richness of the gas mixture in the engine exhaust does not correspond to the richness of the gas mixture in the combustion chamber of the engine. The richness of the gas mixture in the combustion chamber of the engine is a parameter known to those skilled in the art and corresponds in general to the ratio of the amount of fuel to the amount of fresh air admitted by the engine, in other words to the ratio of the amount of fuel to the amount of fresh air admitted into the combustion chambers of the cylinders.

It is particularly difficult to determine the amount of fresh air actually enclosed in the combustion chambers as well as the amount of residual gases, because it would then be necessary to undertake sampling of the gases in the combustion chambers, which is inconceivable in a mass-produced engine.

It is therefore difficult to determine the amount of fuel to be injected to obtain the desired level of torque from the engine and to satisfy the pollution standards for soot, nitrogen oxides, hydrocarbons and carbon monoxide.

In fact, the polluting emissions depend greatly on the thermodynamic conditions of the combustion chamber. For example, in the case of soot, control of the richness of the gas mixture in the combustion chamber of the engine is crucial, because the soot level increases extremely rapidly starting from a certain richness threshold. In particular, if the amount of fuel is too high for an operating point of the engine, or if the mass of air enclosed in the combustion chamber is too small, or even if the amount of residual gases is too high, there is a risk that the soot level will be too high.

In addition, since the proportion of residual gases has an extreme influence on the emissions of nitrogen oxides, the fact that this proportion cannot be determined precisely makes it very difficult to control the engine intended to minimize this type of polluting emissions.

A system and a method for estimating the richness of the gas mixture in the combustion chamber of the engine at the start of the combustion cycle are therefore proposed, in order in particular to be able to control a motor vehicle engine while optimizing the fuel consumption and the discharge of polluting emissions.

A means for estimating the amount of residual gases at the start of the combustion cycle is also proposed.

According to one aspect of the invention, a system is proposed for estimating the richness of the gas mixture in the combustion chamber of an internal combustion engine of a motor vehicle power plant.

The system comprises means for injecting an additional combustible gas into a fresh-air intake circuit of the engine, means for measuring the concentrations of the additional gas respectively in the fresh-air intake circuit and in a gas-exhaust circuit of the engine, determining means for determining a ratio between the measurement of the concentration of the additional gas in the intake circuit and the measurement of the concentration of the additional gas in the exhaust circuit, and estimating means for estimating the richness of the gas mixture in the combustion chamber of the engine from the determined ratio.

This system is simple to construct, and it is particularly adapted to all engine types, whether two-stroke or four-stroke.

The engine may comprise several cylinders, and the estimating means are additionally configured to estimate the flow rate of residual gases in the cylinders from the determined ratio and to estimate the richness of the gas mixture in the combustion chamber of the engine from the estimated flow rate of the residual gases.

A means is provided for estimating an amount of residual gases, in order to be able to control the polluting emissions of the engine more precisely.

The additional gas may be a hydrocarbon in which the carbon chain comprises a number of carbon atoms smaller than five, and preferably the additional gas is methane.

The power plant may comprise a circuit, connected to the fresh-air intake circuit, for partial recirculation of the exhaust gases.

The internal combustion engine may be of the two-stroke type.

The estimating means may be additionally configured to establish a chart of the determined ratio as a function of the engine speed, of the fresh-air flow rate, of the flow rate of fuel injected into the engine, and of the flow rate of recirculated exhaust gases.

According to another aspect of the invention, a method is proposed for estimating the richness of the gas mixture in the combustion chamber of an internal combustion engine of a motor vehicle power plant.

The method comprises injection of an additional combustible gas into a fresh-air intake circuit of the engine, determination of a ratio between a measurement of the concentration of the additional gas in the fresh-air intake circuit and a measurement of the concentration of the additional gas in the gas-exhaust circuit of the engine, and estimation of the richness of the gas mixture in the combustion chamber of the engine from the determined ratio.

The engine may comprise several cylinders, the method comprising an intermediate estimate of the flow rate of residual gases in the cylinders from the determined ratio, and the step of estimation of the richness of the gas mixture in the combustion chamber of the engine includes an estimate of the said richness on the basis of the estimated flow rate of residual gases.

The power plant may comprise a circuit, connected to the fresh-air intake circuit, for partial recirculation of the exhaust gases, and the method may additionally comprise drawing up of a chart of the determined ratio as a function of the engine speed, of a fresh-air flow rate, of a flow rate of fuel injected into the engine, and of a flow rate of recirculated exhaust gases.

Other objectives, characteristics and advantages of the invention will become apparent from reading the description hereinafter, provided solely by way of non-limitative example and created with reference to the attached drawings, wherein.

Figure 1:
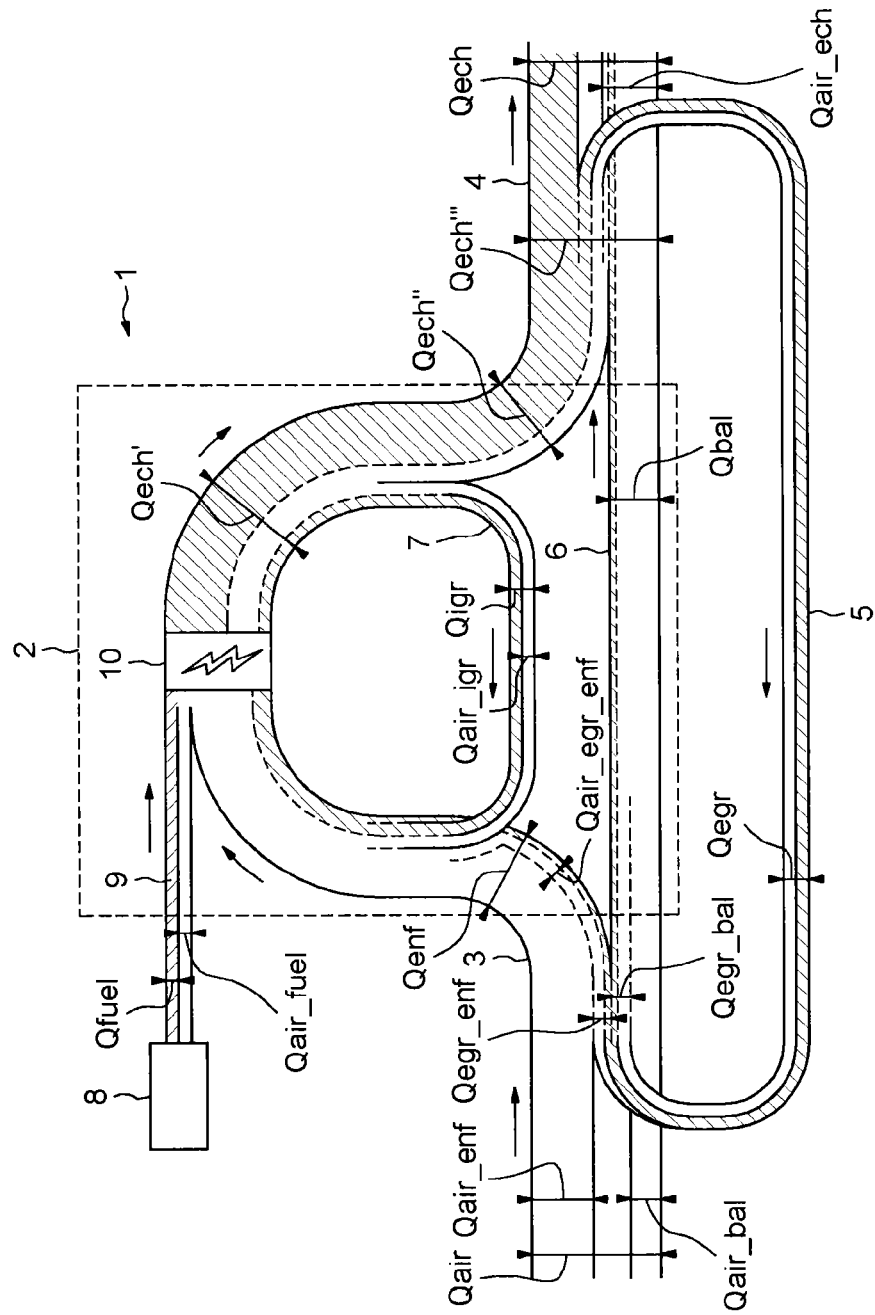
FIG. 1 is a schematic view of the scavenging phenomenon for an internal combustion engine.

FIG. 1 the scavenging phenomenon for a motor vehicle internal combustion engine 1 has been schematically represented. Engine 1 may be a four-stroke engine, preferably a two-stroke engine, running on diesel or gasoline or any other fuel. In addition, engine 1 may be installed in a motor vehicle, a seagoing vessel, a motorcycle.

Engine 1 comprises several cylinders, and for the sake of simplicity one combustion chamber 2 of one cylinder has been represented here. Combustion chamber 2 is connected on the one hand to an intake manifold 3 for injection of fresh air mixed if necessary with part of the exhaust gases into chamber 2, and on the other hand to a gas-exhaust manifold 4.

Engine 1 may also comprise a circuit 5, connected between gas-exhaust manifold 4 and intake manifold 3, for partial recirculation of the exhaust gases.

In FIG. 1 there also has been shown a bypass circulation denoted by 6, which illustrates, purely schematically, the circulation of gases that pass directly from intake manifold 3 to exhaust manifold 4 during the scavenging phenomenon.

Furthermore, an internal recirculation denoted by 7 has been shown that illustrates, purely schematically, the internal recirculation of part of the exhaust gases, referred to as residual gases, that remains enclosed in combustion chamber 2 during the gas-exhaust phase.

Engine 1 also comprises an injector 8 that injects, by way of an injection duct 9, an amount of fuel into combustion chamber 2, represented here by shading, possibly with an amount of air, represented without shading, that is distinct from the fresh air admitted into intake manifold 3.

In general, the arrows of FIG. 1 represent the directions of circulation of the fluids, and the shaded parts, except for that representing the fuel injection, represent the circulation of the burned gases, the parts without shading represent the directions of circulation of the fresh air.

In addition, the combustion of the gases denoted by 10 in chamber 2 has been represented.

In order to represent mass flow rates of gases in engine 1 during the combustion cycles, the following data have been indicated in FIG. 1:

$Q_{air}$ (in kg/h): the mass flow rate of fresh air admitted into combustion chamber 2;

$Q_{enf}$ (in kg/h): the mass flow rate of gases admitted into combustion chamber 2;

$Q_{bal}$ (in kg/h): the mass flow rate of gases that scavenge engine 1;

$Q_{air\_bal}$ (in kg/h): the mass flow rate of fresh air that scavenges engine 1, in other words the amount of fresh air that passes directly into exhaust manifold 4 during the gas-admission phase;

$Q_{air\_enf}$ (in kg/h): the mass flow rate of fresh air enclosed in combustion chamber 2;

$Q_{egr}$ (in kg/h): the mass flow rate of recirculated exhaust gases (fresh air and burned gases);

$Q_{egr\_bal}$ (in kg/h): the mass flow rate of recirculated exhaust gases that scavenge engine 1;

$Q_{egr\_enf}$ (in kg/h): the mass flow rate of recirculated exhaust gases enclosed in combustion chamber 2;

$Q_{air\_egr\_enf}$ (in kg/h): the mass flow rate of fresh air contained in the recirculated exhaust gases enclosed in combustion chamber 2;

$Q_{fuel}$ (in kg/h): the mass flow rate of fuel admitted into combustion chamber 2;

$Q_{air\_fuel}$ (in kg/h): the mass flow rate of air injected with the fuel into combustion chamber 2;

$Q_{igr}$ (in kg/h): the mass flow rate of residual gases, in other words the amount of gases (fresh air and burned gases) that remain in combustion chamber 2 during the gas-exhaust phase;

$Q_{air\_igr}$ (in kg/h): the mass flow rate of fresh air contained in the residual gases;

$Q_{ech}$ (in kg/h): the mass flow rate of exhaust gases;

$Q_{air\_ech}$ (in kg/h): the mass flow rate of fresh air contained in the exhaust gases;

$Q_{ech}'''$ (in kg/h): the mass flow rate of exhaust gases upstream from the partial recirculation 5 of exhaust gases;

$Q_{ech}''$ (in kg/h): the mass flow rate of exhaust gases upstream from the partial recirculation 5 of exhaust gases and upstream from the bypass circulation 6; and $Q_{ech}'$ (in kg/h): the mass flow rate of exhaust gases upstream from the internal recirculation 7.

According to the data described in the foregoing, the following equations are valid:

$$Q_{air} = Q_{air\_bal} + Q_{air\_enf} \quad \text{(equation 1)}$$

$$Q_{egr} = Q_{egr\_bal} + Q_{egr\_enf} \quad \text{(equation 2)}$$

$$Q_{enf} = Q_{air\_enf} + Q_{egr\_enf} \quad \text{(equation 3)}$$

$$Q_{bal} = Q_{air\_bal} + Q_{egr\_bal} \quad \text{(equation 4)}$$

Figure 2:
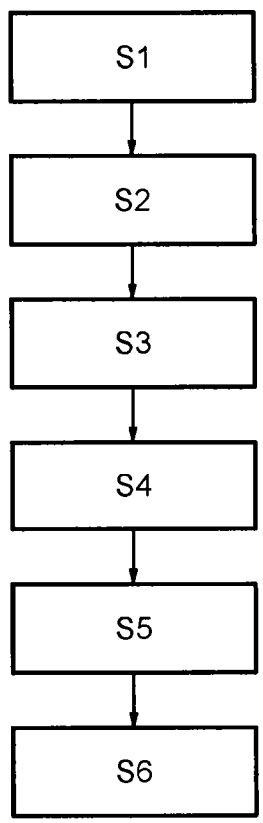
FIG. 2 is a schematic view of the main steps of an embodiment of a method according to the invention for estimating the richness of the gas mixture in the combustion chamber of an engine.

In FIG. 2 the main steps of a method for estimating the richness of the gas mixture in the combustion chamber of internal combustion engine 1 described in FIG. 1 has been schematically represented.

In a first step S1, an additional combustible gas is injected into intake manifold 3. The injection takes place sufficiently upstream from engine 1, for example upstream from the junction between partial recirculation circuit 5 for exhaust gases and intake manifold 3, so as to guarantee homogeneous mixing between the additional combustible gas and the fresh air. Thus, during the scavenging phase, one part of the mass of the additional gas is enclosed in combustion chamber 2 and another part of the additional gas passes into exhaust manifold 4. Because of the homogeneity of mixing of fresh air and additional gas, the mass ratio of the parts of the additional gas is equal to the ratio between the mass of fresh air enclosed in combustion chamber 2 and the mass of scavenged fresh air that passes into exhaust manifold 4. The additional combustible gas may be ethane, propane or butane, and preferably methane CH4. The additional gas is a combustible substance adapted such that the enclosed part can be burned during combustion.

During a second step S2, the concentrations % GCadm and % GCech of the additional combustible gas at the engine intake and exhaust respectively are measured, then in S3 the concentration ratio RC=% GCadm/% GCech is calculated. From the calculated ratio RC, an enclosed air ratio TA is determined in S4 according to the following equation (5):

$$TA = 1 - \frac{Q\text{air} + Q\text{fuel} + Q\text{air\_fuel} + Q\text{egr}}{Q\text{air} \cdot \left(\frac{\% \ GCadm}{\% \ GCech} + \frac{Q\text{egr}}{Q\text{air}}\right)} \quad \text{(equation 5)}$$

where:
% GCadm: concentration of the additional combustible gas in intake manifold 3; and
% GCech: concentration of the additional combustible gas in exhaust manifold 4.

It will be noted that, for certain injection systems, an amount Qair_fuel of air is added to the flow rate Qfuel of fuel. For other systems, the mass flow rate Qair_fuel of injected air is zero.

The enclosed air ratio TA corresponds to the mass of air enclosed in the combustion chamber divided by the mass of fresh air admitted into combustion chamber 2. The enclosed air ratio TA may additionally be charted as a function of engine speed, of measurements of the flow rate Qair of fresh air, of the flow rate Qfuel of fuel injected into the engine, of the flow rate Qair_fuel of air injected with the fuel, and of the flow rate Qegr of recirculated exhaust gases. The chart of the ratio TA may then be used during operation of the vehicle for the purpose of determining other parameters for control of the engine.

In particular, the mass flow rate Qegr of recirculated exhaust gases may be calculated from measurements of carbon dioxide concentration % CO2 in the intake and exhaust of engine 1 from the following equation (6):

$$Q\text{egr} = Q\text{air} \cdot \frac{\% \ CO2adm - \% \ CO2atm}{\% \ CO2ech - \% \ CO2adm} \quad \text{(equation 6)}$$

where:
% CO2adm: the concentration of carbon dioxide in intake manifold 3;
% CO2ech: the concentration of carbon dioxide in exhaust manifold 4; and
% CO2atm: the concentration of carbon dioxide in the atmosphere under normal conditions of temperature and pressure.

In a fifth step S5, the mass flow rate Qigr of residual gases is estimated from the enclosed air ratio TA determined in step S4 according to the following equation (7):

$$Qigr = \frac{cp_{adm} \cdot n \cdot N \cdot 60 \cdot P_{RFA} \cdot V_{RFA}}{r \cdot cp_{ech} \cdot T3'} - \frac{cp_{adm} \cdot Q\text{air\_enf} \cdot T2}{cp_{ech} \cdot T3'} - \frac{Q\text{egr\_enf} \cdot T4}{T3'} \quad \text{(equation 7)}$$

where:

$$Q\text{air\_enf} = TA \cdot Q\text{air} \quad \text{(equation 8);}$$

$$Q\text{egr\_enf} = TA \cdot Q\text{egr} \quad \text{(equation 9);}$$

$cp_{adm}$ (kJ/(kg-K): heat capacity of the intake gases;
n: the number of cylinders of engine 1;
N (rpm): the engine speed;
$P_{RFA}$: the pressure in combustion chamber 2 at the instant of closing of the intake valve or of the passageway of the intake duct;
$V_{RFA}$: the volume of combustion chamber 2 at the instant of closing of the intake valve or of the passageway of the intake duct;
r=287 J/(kg-K): the perfect gas constant; and
$cp_{ech}$ (kJ/(kg-K)): heat capacity of the exhaust gases;

$$T3' = \frac{cp_{ech} \cdot Qech''' \cdot T3 - cp_{bal} \cdot (1 - TR) \cdot (Q\text{air} + Q\text{egr}) \cdot T4'}{cp_{ech} \cdot Qech''}; \quad \text{(equation 10)}$$

$$T4' = \frac{cp_{adm} \cdot Q\text{air\_bal} \cdot T2 - cp_{ech} \cdot Q\text{egr\_bal} \cdot T4}{cp_{adm} \cdot Q\text{air\_bal} + cp_{ech} \cdot Q\text{egr\_bal}}; \quad \text{(equation 11)}$$

$$cp_{adm\_bal} = \frac{cp_{adm} \cdot Q\text{air\_bal} + cp_{ech} \cdot Q\text{egr\_bal}}{Qbal} \quad \text{(equation 12)}$$

$$cp_{adm\_enfl} = \frac{cp_{adm} \cdot Q\text{air\_enf} + cp_{ech} \cdot Q\text{egr\_enf}}{Qenf} \quad \text{(equation 13)}$$

$$Qech'' = Q\text{fuel} + Q\text{air\_fuel} + TA(Q\text{air} + Q\text{egr}) \quad \text{(equation 14);}$$

$$Qech''' = Qech + Q\text{egr} \quad \text{(equation 15);}$$

T2 (K): engine intake temperature;
T3 (K): engine exhaust temperature; and
T4 (K): temperature of the cooled recirculated exhaust gases.

Temperatures T2 to T4 are measured by temperature sensors.

After the mass flow rate Qigr of the residual gases has been estimated, it is possible to calculate the proportion Tigr of residual gases according to the following equation (14):

$$Tigr = \frac{Qigr}{Qigr + Q\text{air\_enf} + Q\text{egr\_enf}} \quad \text{(equation 16)}$$

Then the richness Rmot of the gas mixture in the combustion chamber of the engine can be estimated according to the following equation (15):

$$Rmot = \frac{PCO \cdot Qfuel}{Qair\_enf + Qair\_egr\_enf + Qair\_igr + Qair\_fuel} \quad \text{(equation 17)}$$

where:
PCO=14.7: the air demand of the fuel;

$$Qair\_egr\_enf = \frac{Qair\_ech}{Qech} \cdot Qegr\_enf; \quad \text{(equation 18)}$$

$$Qair\_ech = Qech - Qfuel \cdot (1 + PCO \cdot FMB); \quad \text{(equation 19)}$$

FMB: burned mass fraction or combustion efficiency;

$$Qair\_igr = \frac{Qair\_ech - Qair\_bal + Qair\_egr\_enf}{Qair\_enf + Qegr\_enf + Qfuel + Qair\_fuel} \cdot Qigr. \quad \text{(equation 20)}$$

Figure 3:
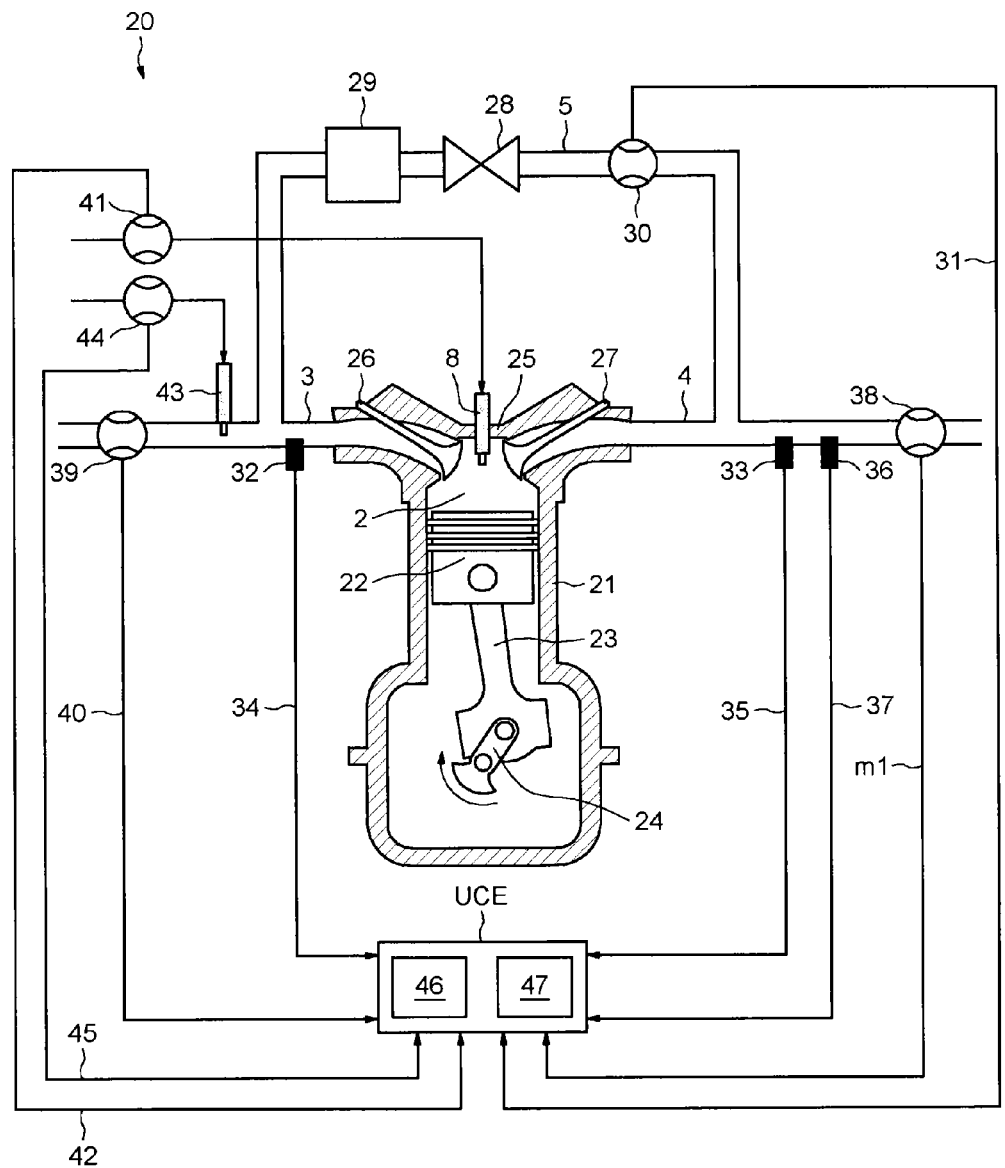
FIG. 3 schematically illustrates an embodiment of a system according to the invention for estimating the richness of the gas mixture in the combustion chamber of an internal combustion engine.

In FIG. 3 a system 20 for estimating the richness Rmot of the gas mixture in the combustion chamber of the internal combustion engine 1 described in FIG. 1 has been schematically represented. The estimating system 20 is additionally configured to employ the estimating method described in the foregoing.

Internal combustion engine 1 comprises several cylinders, of which one cylinder 21 has been shown for simplicity, in which cylinder a piston 22 reciprocates by means of a rod 23 connecting piston 22 to a crankshaft 24. Combustion chamber 2 of engine 1 is bounded by the said cylinder 21, the said piston 22 and a cylinder head 25. According to a first embodiment, cylinder head 25 is provided with at least two valves 26, 27, which make it possible to place combustion chamber 2 in communication with respectively intake manifold 3 and gas-exhaust manifold 4. According to a second embodiment, cylinder head 25 does not comprise valves but instead has an admission passageway or intake duct, which places combustion chamber 2 in communication with intake manifold 3, and an exhaust passageway or exhaust duct, which places combustion chamber 2 in communication with gas-exhaust manifold 4. The second embodiment is particularly suitable for two-stroke engines, the operation of which is known to those skilled in the art, in particular the movement of piston 22 of which makes it possible on the one hand to block the admission and exhaust passageways during the combustion and expansion phases and on the other hand to allow placing the passageways in communication with combustion chamber 2 during the gas intake and exhaust phases.

Circuit 5 for partial recirculation of exhaust gases comprises a gate valve 28, denoted as gate valve EGR, a gas-cooling device 29 and a flow meter 30 for measuring the flow rate Oegr. The measurement of the flow rate Qegr is transmitted via a connecting line 31 toward an electronic control unit UCE.

Estimating system 1 additionally comprises sensors 32, 33 for measuring respectively the mass concentration % CO2adm of carbon dioxide in the intake and the mass concentration % CO2ech of carbon dioxide in the exhaust, and for transmitting these information streams to the UCE via respective connecting lines 34, 35.

The system comprises a sensor 36 for measuring the concentration % GCadm of additional combustible gas in intake manifold 3 and for transmitting it to the UCE via connecting line 37.

A flow meter 38 situated downstream from gas-exhaust manifold 4 measures the flow rate Qech of the exhaust gases and transmits the measurement to the UCE via a connecting line m1.

A flow meter 39 situated upstream from intake manifold 3 measures the flow rate Qair of fresh air and transmits the measurement to the UCE via a connecting line 40. A flow meter 41 coupled with fuel injector 8 measures the flow rate Qfuel of fuel and transmits the measurement to the UCE via a connecting line 42.

An injector 43 injects the additional combustible gas into the fresh-air intake circuit of the engine. Injector 43 is situated upstream from intake manifold 3, for example between flow meter 39 and intake manifold 3. A flow meter 44 coupled with additional combustible gas injector 43 measures the flow rate of additional gas and transmits the measurement to the UCE via a connecting line 45, so that the UCE can calculate the concentration % GCadm of additional combustible gas in intake manifold 3.

The UCE contains determining means 46 configured to determine the concentration ratio RC=% GCadm/% GCech from the measurement delivered by sensor 36 and the measurement delivered by flow meter 44. The UCE also contains estimating means 47 for estimating the flow rate Qigr from the concentration ratio RC and for estimating the richness Rmot of the gas mixture in the combustion chamber of the engine from the flow rate Qigr.

The method and the system just described make it possible to control an internal combustion engine in order to optimize the fuel consumption and the levels of polluting emissions. In particular, the estimates of the richness Rmot of the gas mixture in the combustion chamber of the engine and of the flow rate Qigr are made on the basis of simple measurements of flow rate and temperature. The chart of the enclosed air ratio TA and the foregoing estimates make it possible to adjust the engine parameters, for example supercharging and injection, in order to limit the polluting emissions and the fuel consumption of the engine.

The invention claimed is:

1. A system for estimating richness of a gas mixture in a combustion chamber of an internal combustion engine of a motor vehicle power plant, the gas mixture serving as primary fuel for the engine, the system comprising:
   means for injecting an additional combustible gas into a fresh-air intake circuit of the engine,
   means for measuring a concentration of the additional combustible gas in the fresh-air intake circuit and a concentration of the additional combustible gas in a gas-exhaust circuit of the engine,
   means for determining a ratio between a measurement of the concentration of the additional combustible gas in the intake circuit and a measurement of the concentration of the additional combustible gas in the gas-exhaust circuit, and
   means for estimating the richness of the gas mixture in the combustion chamber of the engine from the determined ratio.

2. The system according to claim 1, wherein the engine comprises plural cylinders and the estimating means are additionally configured to estimate a flow rate of residual gases in the cylinders from the determined ratio and to estimate the richness of the gas mixture in the combustion chamber of the engine from the estimated flow rate of the residual gases.

3. The system according to claim 1, wherein the power plant comprises a circuit, connected to the fresh-air intake circuit, for partial recirculation of exhaust gases.

4. The system according to claim 1, wherein the engine is of a two-stroke type.

5. The system according to claim 3, wherein the estimating means are configured to establish a chart of the determined ratio as a function of a fresh-air flow rate, of a flow rate of fuel injected into the engine, and of a flow rate of the recirculated exhaust gases.

6. A method for estimating richness of a gas mixture in a combustion chamber of an internal combustion engine of a motor vehicle power plant, the gas mixture serving as primary fuel for the engine, the method comprising:

injecting an additional combustible gas into a fresh-air intake circuit of the engine, determining a ratio between a measurement of a concentration of additional gas in the fresh-air intake circuit and a measurement of concentration of additional gas in a gas-exhaust circuit of the engine, and estimating richness of the gas mixture in the combustion chamber of the engine from the determined ratio.

7. The method according to claim 6, wherein the engine comprises plural cylinders, the method comprising an intermediate estimate of a flow rate of residual gases in the cylinders from the determined ratio, and the estimating of the richness of the gas mixture in the combustion chamber of the engine includes an estimate of the richness based on the estimated flow rate of the residual gases.

8. The method according to claim 6, wherein the power plant comprises a circuit, connected to the fresh-air intake circuit, for partial recirculation of exhaust gases, the method further comprising drawing up a chart of the determined ratio as a function of the engine speed, of a fresh-air flow rate, of a flow rate of fuel injected into the engine, and of a flow rate of recirculated exhaust gases.

* * * * *